(12) United States Patent
Souma

(10) Patent No.: US 6,191,420 B1
(45) Date of Patent: Feb. 20, 2001

(54) INFRARED SENSOR

(75) Inventor: Terumitsu Souma, Kanagawa-ken (JP)

(73) Assignee: Terumo Kabushiki Kaisha, Tokyo (JP)

( * ) Notice: Under 35 U.S.C. 154(b), the term of this patent shall be extended for 0 days.

(21) Appl. No.: 09/099,328

(22) Filed: Jun. 18, 1998

(30) Foreign Application Priority Data

Jun. 20, 1997 (JP) .................................................. 9-164220

(51) Int. Cl.$^7$ ...................................................... G01T 1/16
(52) U.S. Cl. ...................... 250/338.1; 250/350; 250/349; 250/343
(58) Field of Search ................................. 250/338.1, 350, 250/349, 353

(56) References Cited

U.S. PATENT DOCUMENTS 3,629,585   12/1971   Desvignes .

FOREIGN PATENT DOCUMENTS

| 63-265125 | 11/1988 | (JP) . | |
|---|---|---|---|
| 06281750 | * 10/1994 | (JP) | ................................... 250/338.1 |
| 7-5047 | 1/1995 | (JP) . | |
| 8-159866 | 6/1996 | (JP) . | |

* cited by examiner

Primary Examiner—Constantine Hannaher
Assistant Examiner—Andrew Israel
(74) Attorney, Agent, or Firm—Burns, Doane, Swecker & Mathis, LLP

(57) ABSTRACT

In an infrared sensor including a compensating element and an infrared sensitive element, the main bodies of which consist of temperature-sensing layers of germanium and are supported on a single-crystal silicon substrate with bridge structures of silicon oxynitride layers; infrared protection layers individually made of aluminum and/or gold with a thickness of 0.1–1.0 μm formed on both sides of the main body of the compensating element via insulating layers of silicon oxynitride of about 0.1–10 μm for almost completely shielding the compensating element from incident infrared rays and improving the sensor's sensitivity.

22 Claims, 6 Drawing Sheets

INFRARED SENSOR

BACKGROUND OF THE INVENTION

1. Field of the Invention

The present invention relates to an infrared sensor for measuring temperatures of objects by means of measuring radiation temperatures without making physical contacts with the objects.

2. Description of the Related Art

An infrared sensor basically comprises an infrared sensitive element for capturing infrared rays and a compensating element for obtaining a signal that is used as a basis for calculating the quantity of infrared rays detected. Such an infrared sensor has the structure that prevents infrared rays from entering the compensating element. In order to measure the quantity of infrared rays detected by the infrared sensitive element accurately based on the signal output from the compensating element, it is preferable that the compensating element and the infrared sensitive element have identical characteristics. Therefore, it is common to use the same material and shape for both the compensating element and the infrared sensitive element to equalize their characteristics.

However, the characteristics of these elements may differ from each other minutely due to variations in manufacturing conditions. When a sensor is miniaturized, in particular, and delicate temperature changes have to be measured accurately, it may become impossible to compensate the measured values due to the difference of their characteristics. Therefore, it is necessary to evaluate with each sensor if it is necessary to match the characteristics of the infrared sensitive element and the compensating element.

Japanese Patent Unexamined Publication JP-A-08-159866 (1996) discloses an infrared sensor comprising an infrared sensitive element for infrared rays, a compensating element for compensating the measured values of the infrared sensitive element, and a processing circuit all formed on a single substrate. The elements are maintained in a vacuum environment.

The characteristics of the infrared sensitive element and the compensating element are easily equalized as they are both formed simultaneously on the identical substrate. In other words, there is no need for further matching the characteristics between the infrared sensitive element and the compensating element to improve the accuracy of the measured values.

Moreover, the infrared sensor has the infrared barrier layer for covering the entire internal surface of a package body (comprising top and bottom covers) hermetically sealed to maintain a vacuum inside, and an infrared transmission aperture provided on an area of the infrared sensitive element side of the top cover. In other words, the design allows infrared rays to enter an element that functions as the infrared sensitive element but prevents infrared rays from entering another element that functions as the compensating element.

However, in a design where an infrared transmission area is provided in one area of the package body and the rays are prevented from entering the sensor through any other parts of the package body, it is necessary to minimize the area of infrared transmission in order to block infrared rays from the compensating element completely. This causes a problem because it limits the view angle of the infrared sensitive element and the quantity of incident infrared rays, thus reducing the sensitivity of the sensor itself. Also, the infrared rays entered through the infrared transmission area makes random reflections inside the package body and may inadvertently enter the compensating element though the quantity may be small. Hence, there still remained a problem of not being able to detect delicate changes of infrared rays in the prior art.

SUMMARY OF THE INVENTION

The purpose of the present invention is to provide an infrared sensor with an improved sensitivity by preventing infrared rays from entering the compensating element.

In one aspect of this invention, areas through which infrared rays may enter the compensating element are covered with infrared protection layers via insulation layers to prevent infrared rays from entering the compensating element.

In another aspect of this invention, an infrared sensor having infrared protection layers on the front and back side of the compensating element can be easily manufactured.

Another aspect of the present invention is an infrared sensor comprising: an infrared sensitive element for detecting infrared rays; a compensating element for obtaining a signal to be used as a basis for calculating a quantity of infrared rays detected; and an infrared protection layer formed on a surface of said compensating element for protecting it from infrared rays.

Another aspect of the present invention is a method of manufacturing an infrared sensor comprising the steps of: (a) forming a pattern of first infrared protection layer on a first surface of a silicon substrate; (b) forming first insulation layers on the first surface and a second surface opposite to the first surface; (c) forming a pattern of temperature-sensing layer on the first insulation layer on the first surface; (d) forming a wiring pattern on the first insulation layer and the temperature-sensing pattern; (e) forming a pattern of second insulation layer on the first surface; (f) forming a wiring pattern on the temperature-sensing layer; (g) forming a third insulation layer on the first surface; and (h) forming a pattern of second infrared protection layer on the third insulation layer.

Another aspect of the present invention is a method of manufacturing an infrared sensor comprising the steps of: (a) forming first insulation layers on a first surface and a second surface opposite to the first surface of a silicon substrate; (b) forming a pattern of temperature-sensing layer on the first insulation layer on the first surface; (c) forming a wiring pattern on the first insulation layer and the temperature-sensing pattern; (d) forming a pattern of second insulation layer on the first surface; (e) forming a wiring pattern on the temperature-sensing layer; (f) forming a third insulation layer on the first surface; (g) forming a pattern of bridge structures from the first through third insulation layers on the first surface; (h) forming a window frame-shaped pattern from the first insulation layer on the second surface; (i) etching the second surface using the pattern of the first insulating layer as a mask to expose an inner surface of the first insulating layer on the first surface; (j) forming a pattern of infrared protection layer on the inner surface of the first insulating layer; and (k) forming a pattern of infrared protection layer on the third insulation layer.

Another aspect of the present invention is a method of manufacturing an infrared sensor comprising the steps of: (a) forming a pattern of first infrared protection layer on a first surface of a silicon substrate; (b) forming first insulation layers on the first surface and a second surface opposite to the first surface of the silicon substrate; (c) forming a pattern of temperature-sensing layer on the first insulation layer on the first surface; (d) forming a wiring pattern on the first insulation layer and the temperature-sensing pattern; (e) forming a pattern of second insulation layer on the first surface; (f) forming a wiring pattern on the temperature-sensing layer; (g) forming a third insulation layer on the first surface; (h) forming a pattern of bridge structures from the first through third insulation layers on the first surface; (i) forming a window frame-shaped pattern from the first insulation layer on the second surface; (j) etching the second surface using the pattern of the first insulating layer as a mask to expose an inner surface of the first insulating layer on the first surface; and (k) forming a pattern of second infrared protection layer on the third insulation layer.

The objects, features, and characteristics of this invention other than those set forth above will become apparent from the description given herein below with reference to preferred embodiments illustrated in the accompanying drawings.

DETAILED DESCRIPTION OF THE PREFERRED EMBODIMENT

The embodiments of this invention will be described below with reference to the accompanying drawings.

Figure 1:
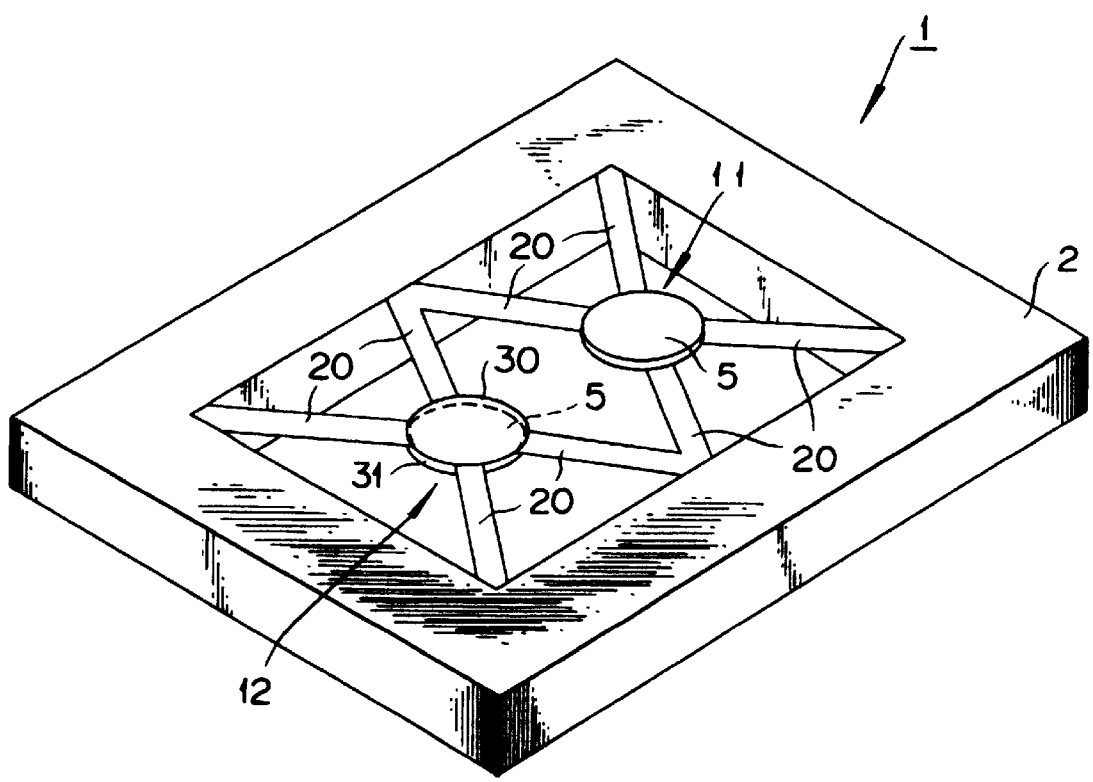
FIG. 1 is a perspective view of an infrared sensor, an embodiment of the present invention.

FIG. 1 is a perspective view illustrating the structure of an infrared sensor to which the present invention is applied. The wiring, contact pad, and insulation layers except the bridge structures are omitted from the drawing.

The infrared sensor 1 comprises an infrared sensitive element 11 that detects infrared rays and a compensating element 12 supported by four bridge structures 20 in a space provided on a single crystal silicon substrate 2.

Both the infrared sensitive element 11 and the compensating element 12 have a main body 5, which is made of the same material and has the same shape. In this embodiment, the main body 5 comprises germanium used as the material of the temperature-sensing layer to which metal wires are attached by ohmic connection. The infrared sensitive element 11 and the compensating element 12 constitute an element structure called "thermistor type bolometer". Single crystal, polycrystal or amorphous of silicon, semiconductor compounds of GaAs and ceramics may be used as the temperature-sensing layer. A temperature-sensing layer itself made of one of the above materials, or a combination of such a temperature-sensing layer and metal wiring can be used as the main body. In other words, various items that can be used for conventional infrared sensors, can be used here.

The main body 5 of the infrared sensitive element 11 is covered by an insulation layer and infrared rays are not blocked from it. On the other hand, both sides of the compensating element 12 are covered by infrared protection layers 30, 31 via insulation layers to block infrared rays. The infrared protection layers 30, 31 can almost completely block stray infrared rays from the compensating element 12. Incidentally, the infrared protection layer is to cover an area through which infrared rays may enter the compensating element. Accordingly, when infrared rays may enter only one side of the compensating element, or when random reflections of the infrared rays, which are entered through the infrared transmission area, inside the package body may be disregarded by reason of inner walls of the package body constituting the black body, it is not necessary to form the infrared protection layers on both sides of the compensating element 12.

Aluminum and copper are particularly preferable as the materials for infrared protection layers 30, 31 as they can be easily applied in the first embodiment according to a manufacturing method described later. Incidentally, gold is also preferable in the second embodiment described later. It goes without saying that various metals such as molybdenum, tungsten and titanium that are commonly used in the manufacturing process of semiconductor devices, as well as their alloys and silicides, can be used as well. These materials are preferable as the infrared protection layers for the compensating element not only because they block infrared rays but also because they are capable of reflecting infrared rays due to glossiness of their surfaces.

In the present embodiment of the invention, the infrared barrier layers or the infrared protection layers 30, 31 are made of aluminum and/or gold. The thickness of the aluminum and gold layer is chosen to be about 0.1–1.0 μm to block infrared rays completely on the assumption that the wavelength of infrared rays is in the range of 5–25 μm.

Silicon oxynitride layers, which will be discussed later, are used as the insulation layers between the infrared protection layers 30, 31 of the compensating element 12 and the main body 5. The gap between the main body 5 and the infrared protection layers 30, 31 (i.e., the thickness of the silicon oxynitride layers) is preferably 0.1–10 μm. This gap is preferably as thin as possible so long as the necessary insulation is achieved. However, the minimum thickness obtainable from the current semiconductor device manufacturing technology is approximately 0.1 μm. On the other hand, the upper limit of the thickness is chosen to be approximately 10 μm because the thicker the layer takes the longer it takes to be formed. Of course, it is possible to form a layer thicker than this upper limit, but if a layer is too thick, it may introduce infrared rays between the main body 5 of the compensating element and the infrared protection layers 30, 31.

Bridge structures 20 support the silicon substrate 2 as well as the infrared sensitive element 11 and the compensating element 12 under an electrically separated condition. In the present embodiment of the invention, the bridge structures 20 are formed from an insulation layer made of silicon oxynitride. Also, a silicon oxide layer, a silicon nitride layer or a lamination of them can be used for forming the bridge structure 20. However, considering its strength as the bridge structure member sufficient to support the infrared sensitive element and the compensating element, and a stress difference between it and the silicon substrate, a silicon oxynitride is the most preferable material. Because it has the characteristics of both silicon oxide and silicon nitride and a good stress balance. The bridge structure can have a cantilever or diaphragm type structure in addition to the style applied in this embodiment, which is supported by four bridges.

Next, a first embodiment according to the method of manufacturing the infrared sensor of the present invention will be described referring to FIGS. 2 through 11. The method of manufacturing the infrared sensor is essentially equal to that of semiconductor devices. Therefore, only the subjects unique to the structural features of the infrared sensor will be covered in the following description.

Figure 2:
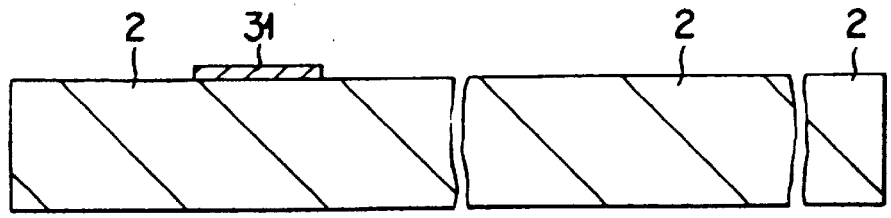
FIG. 2 is a schematic cross section illustrating the step of forming a first infrared protection layer on the back side of the compensating element according to a first embodiment of the method of manufacturing an infrared sensor of the present invention.

The first step is to form an infrared protection layer 31 on the front surface of the silicon substrate 2 as shown in FIG. 2.

First, a silicon substrate with (100) crystal plane orientation is prepared. Next, as in the process of manufacturing semiconductor devices, the silicon substrate 2 is washed and the oxidation layers naturally formed on both sides of the silicon substrate are removed. Then, on the surface of the silicon substrate 2, an aluminum layer, which will be a first infrared protection layer 31 on the back side of the compensating element, is formed using a DC sputter until it grows to a thickness of 0.1 μm. Next, a pattern is applied on the first infrared protection layer 31 of the silicon substrate 2 by means of photolithography and wet etching using a conventional resist material to remove everything except the compensating element area. If copper is to be used in place of aluminum, it is possible to form a copper layer by means of the vacuum deposition method, and patterning can be done by means of photolithography and wet etching using nitric acid as the etchant.

The silicon substrate 2 can be produced, if so desired, from the same material used in substrates of conventional semiconductor devices (memory, logic LSI, etc.). Also, a thinly ground material can be used in order to facilitate the etching process of the silicon substrate in a later step to be explained afterward (refer to FIG. 11).

Figure 3:
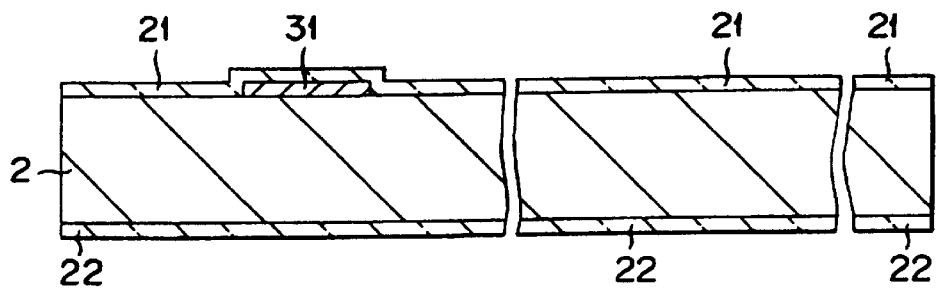
FIG. 3 is a schematic cross section illustrating the step of forming a first insulation layer.

Next, first insulation layers 21, 22 are to be formed on both sides of the silicon substrate 2 as shown in FIG. 3. The first insulation layers 21, 22 are constituted of silicon oxynitride layers of 1 μm thickness formed by the plasma CVD.

The reason that the plasma CVD method is used for forming the silicon oxynitride layers is that the infrared protection layer was formed using aluminum in the previous step. In other words, the plasma CVD method is used because of its lower layer forming temperature compared to those of the normal pressure CVD and the reduced pressure CVD methods as aluminum prohibits the use of a high temperature process. If a high melting temperature metal such as molybdenum, titanium or tungsten is used for the infrared protection layer, a high temperature process can be used in addition to the plasma CVD method.

The silicon oxynitride layer formed as the first insulation layer 22 on the back side of the silicon substrate 2 will be used as the mask in etching the silicon substrate in a later step. Therefore, the silicon oxynitride layer can be formed independently in a later separate step if so desired. For example, after silicon oxynitride layers are formed on both sides of the silicon substrate 2 with the conventional CVD method, only the layer on the front surface is removed to expose the surface of the silicon substrate, then an aluminum layer, which is to become the first infrared protection layer 31, is formed on the surface and, finally, the first insulation layer 21 consisting of a silicon oxynitride layer is formed to prepare for the processes that follow.

Depending on the selection of the echant for the etching process of the silicon substrate, it is also possible to use silicon oxide in place of silicon oxynitride. The thermal oxidation method can be used to form the insulation layer in this case. Also, a mask made of a plastic material, such as the resist, can be used so long as it can withstand the etching process of the silicon substrate. In such a case, it is necessary to coat the silicon substrate immediately before the etching process in a later step, with the plastic material to be used as the mask.

Figure 4:
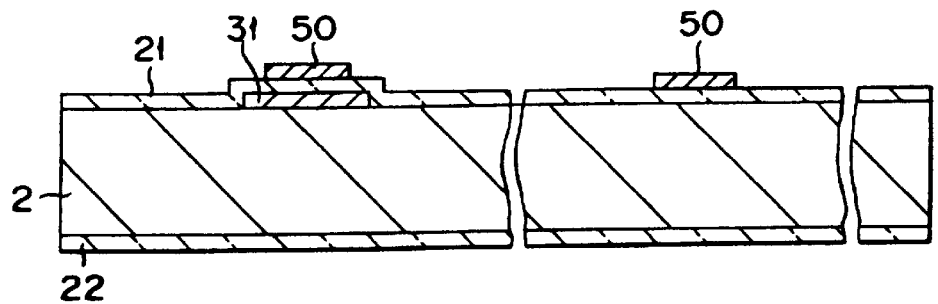
FIG. 4 is a schematic cross section illustrating the step of forming a temperature-sensing layer.

Next, a temperature-sensing layer 50 of the element main body is formed as shown in FIG. 4.

The temperature-sensing layer 50 is a germanium layer with a thickness of 1.0 μm, to be formed by the sputtering process on the silicon oxynitride layer (first insulation layer) 21 of the silicon substrate 2. The temperature-sensing layer 50 is processed by patterning using the photolithography and the reactive ion etching methods.

Figure 5:
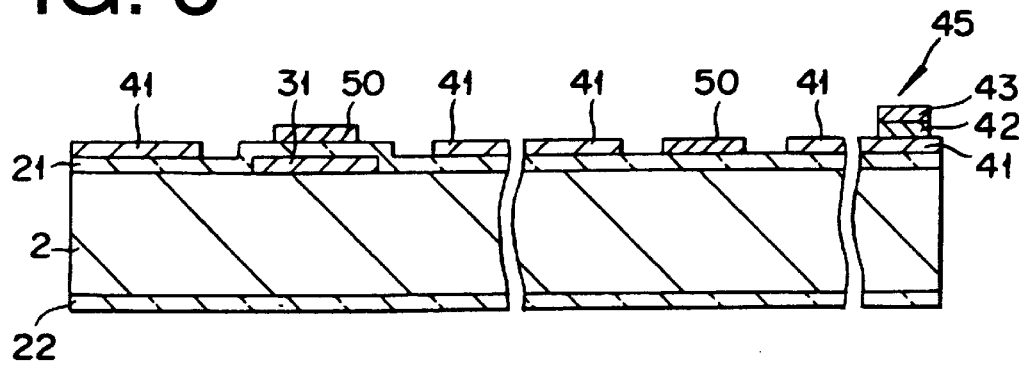
FIG. 5 is a schematic cross section illustrating the step of forming lead wires and a contact pad as wiring pattern.

Next, a contact pad 45 and lead wiring connected to the element main body are formed on the silicon oxynitride 21 located on the front surface of the silicon substrate 2 as shown in FIG. 5 (formation of wiring pattern).

In order to accomplish this, first of all, the silicon substrate 2 is coated with a resist. The resist is then patterned using photolithography. A chromium layer 41, a copper layer 42, and a titanium layer 43 are formed on the resist pattern by means of the vacuum deposition method. Next, in order to leave the area to generate a contact pad, a resist mask is formed on the area. The copper layer 42 and the titanium layer 43 are then etched using an echant such as nitric acid to form a contact pad 45. The wiring will be completed by the lift-off method.

Figure 6:
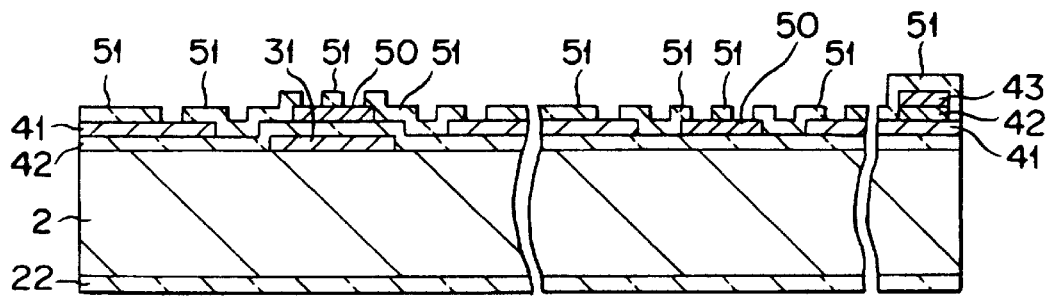
FIG. 6 is a schematic cross section illustrating the step of forming a second insulation layer.

Next, a second insulation layer 51 for the wiring is formed on the temperature-sensing layer (germanium layer) 50 as shown in FIG. 6. The second insulation layer 51 consists of a silicon oxynitride layer formed to cover the entire substrate surface and patterned to produce a comb shape on the temperature-sensing layer 50. As the patterning process, either a dry etching, e.g., chemical dry etching or reactive ion etching, or a wet etching using buffer hydrofluoric acid can be used. However, in case of a wet etching, it is necessary to form an etching protection layer with resist for the entire back surface to protect the silicon oxynitride layer on the back surface of the silicon substrate.

Figure 7:
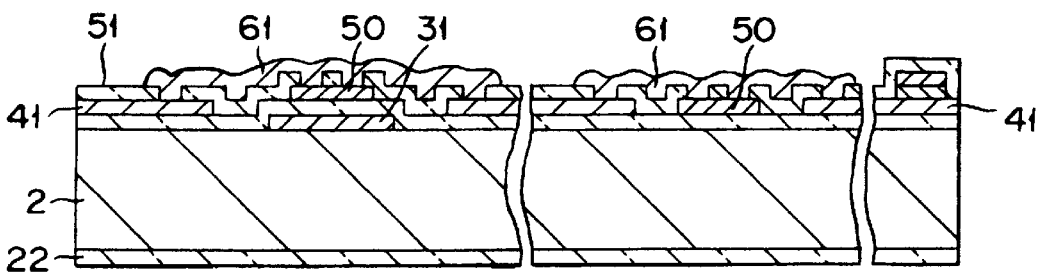
FIG. 7 is a schematic cross section illustrating the step of forming an aluminum layer that constitutes the wiring pattern.

Next, a wiring pattern 61 is formed on the temperature sensitive layer 50 as shown in FIG. 7. Wiring 61 is formed from aluminum using the RF sputtering method. In this case, a comb-shaped silicon oxynitride layer (second insulation layer) 51 is already formed on the temperature sensitive layer 50. Therefore, when aluminum is sputtered on the temperature-sensing layer 50, it forms comb-shaped wiring. The unnecessary part of the formed aluminum layer 61 is then removed by photolithography and etching.

Figure 8:
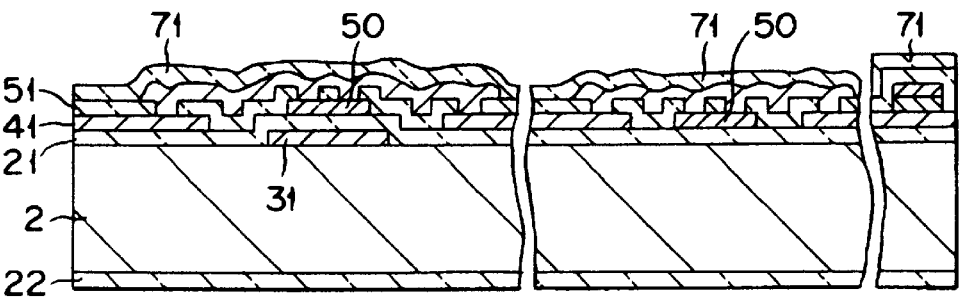
FIG. 8 is a schematic cross section illustrating the step of forming a third insulation layer that constitutes a protective layer on the substrate surface.

After that, a third insulation layer 71, which will serve as the protective layer of the substrate's surface, is formed as shown in FIG. 8. The third insulation layer 71 consists of a silicon oxynitride layer. Since aluminum is used as the wiring material and the infrared protection layer, a high temperature process cannot be used. Therefore, the plasma CVD method is used because of its lower layer forming temperature compared to those of the normal pressure CVD and the reduced pressure CVD methods.

Figure 9:
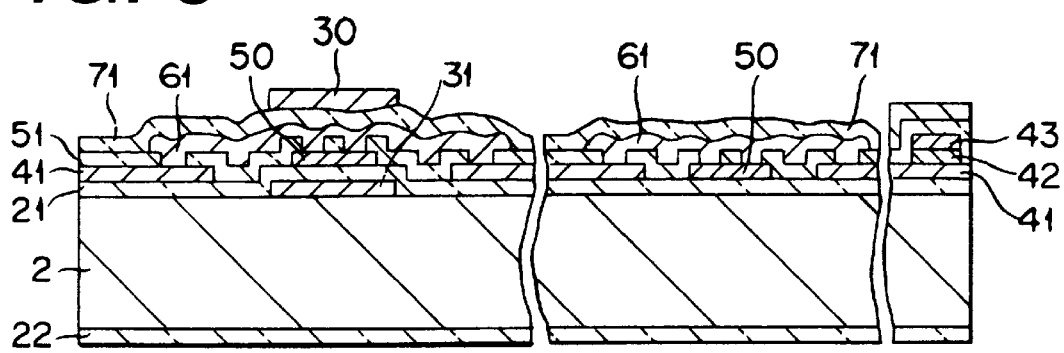
FIG. 9 is a schematic cross section illustrating the step of forming a second infrared protection layer on the compensating element surface.

Next, a second infrared protection layer 30 is formed on the front surface side of the compensating element 12 as shown in FIG. 9. The second infrared protection layer 30 is an aluminum layer with a thickness of 0.1 $\mu$m, which is patterned using photolithography and etching to leave only an area corresponding to the compensating element 12.

Figure 10:
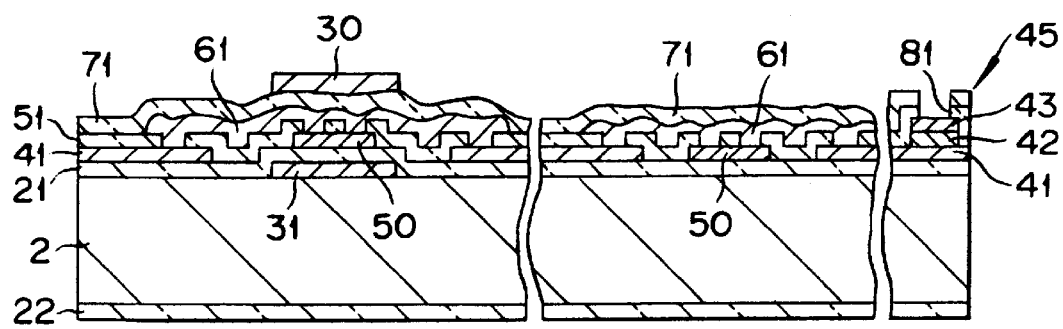
FIG. 10 is a schematic cross section illustrating the step of forming contact holes on the contact pad.

Then, a contact hole 81 is formed on the contact pad area as shown in FIG. 10. It is formed by etching the silicon oxynitride layer (third insulation layer) 71 by means of photolithography and reactive ion etching to expose the surface of the contact pad area.

Figure 11:
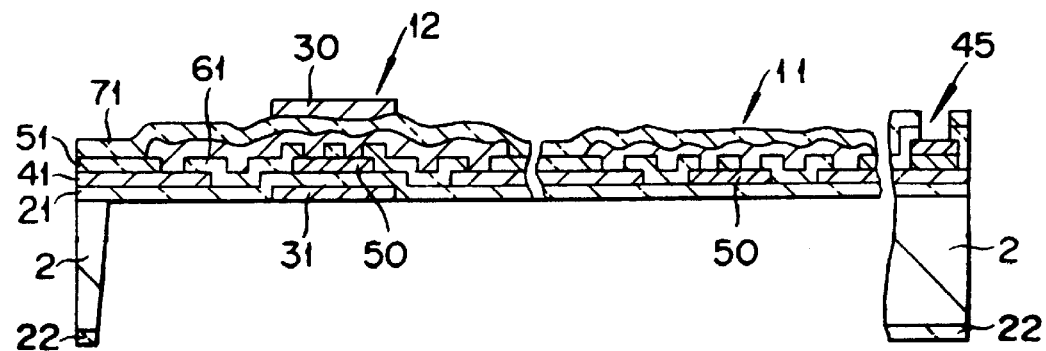
FIG. 11 is a schematic cross section illustrating the step of forming bridge structures.

Next, the bridge structure is formed as shown in FIG. 11

In order to accomplish it, the silicon oxynitride layers (first through third insulation layers) 21, 51 and 71 are coated with the resist. The resist is then patterned with a shape of the bridge structure by means of photolithography. The silicon oxynitride layers 21, 51 and 71 are etched by means of reactive ion etching to cause the expose everything except the bridge structure areas of the silicon substrate 2, thus forming the pattern of the bridge structure.

Finally, the silicon oxynitride layer (first insulation layer) 22 on the back surface of the silicon substrate 2 is etched to form a window frame-shaped pattern that corresponds to a frame work of the infrared sensor. With the remaining window frame-shaped silicon oxynitride layer 22 serving as the mask, the back side (inside of the frame) of the elements of the silicon substrate 2 is wet etched using hydrazine hydrate ($N_2H_4 \cdot H_2O$) as the echant.

Thus, the infrared sensor as shown in FIG. 1 is produced, wherein the infrared sensitive element 11 and the correcting element 12 are supported by bridge structures. In case of the infrared sensor, infrared rays are almost completely blocked out of the main body of the compensating element 12 as the main body 5 of the compensating element 12 is covered by the infrared protection layers 30, 31 made of aluminum.

Figure 12:
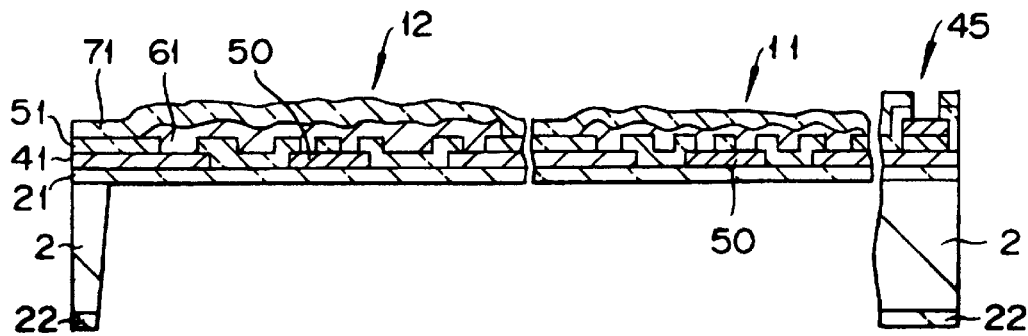
FIG. 12 is a schematic cross section illustrating the step of forming bridge structures according to a second embodiment of the method of manufacturing an infrared sensor.

Next, a second embodiment according to the method of manufacturing the infrared sensor of the present invention will be described referring to FIGS. 12 through 14. The second embodiment is characterized by that the infrared protection layers are formed in the later steps. Namely, the second embodiment is the same as the first embodiment concerning the steps to the formation of bridge structures except the steps of forming a pattern of first infrared protection layer and forming a pattern of second infrared protection layer. Thus, steps after the formation of bridge structures will be explained mainly.

First, without the formation of the first infrared protection layer in advance, the first insulation layers 21 and 22, the temperature-sensing layer 50, the wiring pattern, the second insulation layer 51, the wiring pattern on the temperature-sensing layer 50, the third insulation layer 71, the contact hole 81, and the bridge structures are formed in order (refer to FIGS. 3–8, 10 and 11). As a result, a semi-finished infrared sensor comprising the infrared sensitive element 11 and the compensating element 12 supported on the silicon substrate 2 by means of the bridge structure is obtained as shown in FIG. 12. Incidentally, a high temperature process may be applied to the formation of the silicon oxynitride layers as the insulation layers because of no existence of a low melting temperature metal such as aluminum. Thus, the normal pressure CVD and the reduced pressure CVD methods can be used in addition to the plasma CVD method.

Figure 13:
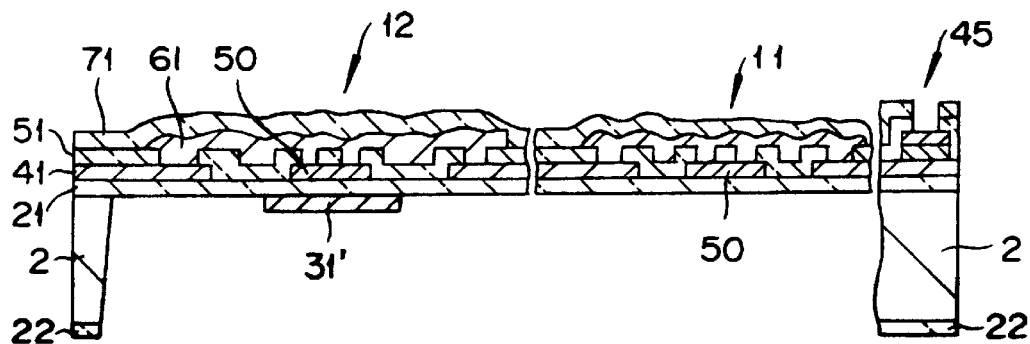
FIG. 13 is a schematic cross section illustrating the step of forming a first infrared protection layer on the back side of the compensating element.

Next, a gold layer 31' as the first infrared protection layer is formed on the back side of the first insulating layer 21 on the front side of the silicon substrate 2, which corresponds to the back side of the main body of the compensating element 12, by means of spattering using a mask (not shown), as shown in FIG. 13.

Figure 14:
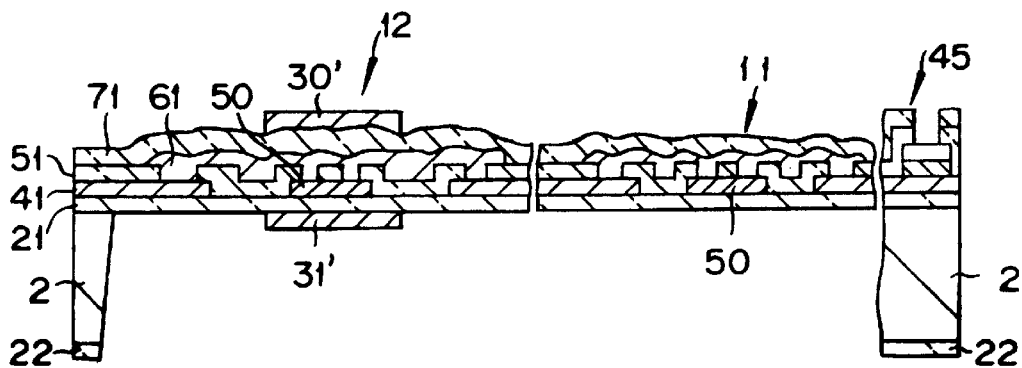
FIG. 14 is a schematic cross section illustrating the step of forming a second infrared protection layer on the compensating element surface.

Finally, a gold layer 30' as the second infrared protection layer is formed on the third insulation layer 71 on the front side of the main body of the compensating element 12 as shown in FIG. 14. In consequence, a finished infrared sensor, in which the compensating element 12 is covered with the infrared protection layers (gold layers) 30' and 31', is produced. Incidentally, the thickness of the gold layer is chosen to be about 0.1–1.0 $\mu$m to block infrared rays completely on the assumption that the wavelength of infrared rays is in the range of 5–25 $\mu$m. If an area through which infrared rays may enter the compensating element, is considered only one side of the compensating element, the first infrared protection layer forming step (refer to FIG. 13) may be omitted.

Next, a third embodiment according to the method of manufacturing the infrared sensor of the present invention will be described referring to FIGS. 15 through 17. The third embodiment is characterized by combining the first embodiment with the second embodiment. To put it concretely, a material constituting the first infrared protection layer is different from a material constituting the second infrared protection layer and the steps to the formation of bridge structures are the same as the first embodiment except the step of forming a pattern of second infrared protection layer.

Particularly, the first infrared protection layer 31 of aluminum, the first insulation layers 21 and 22, the temperature-sensing layer 50, the wiring pattern, the second insulation layer 51, the wiring pattern on the temperature-sensing layer 50, and the third insulation layer 71 are formed in order (refer to FIGS. 2–8). Since the infrared protection layer was formed using aluminum, the plasma CVD method is used for forming the insulation layers as the silicon oxynitride layers.

Figure 15:
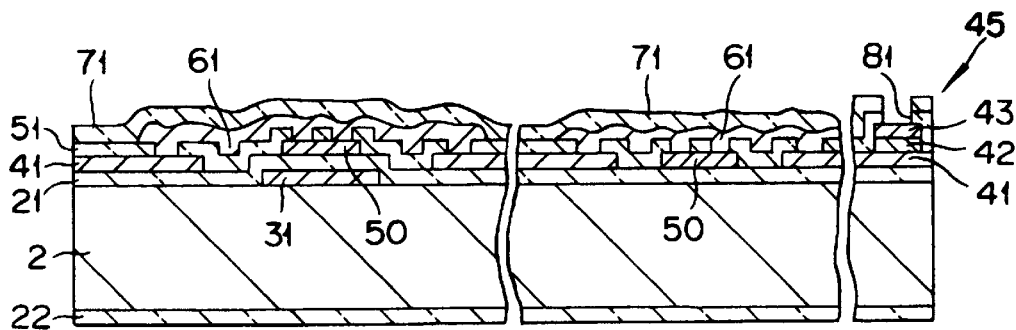
FIG. 15 is a schematic cross section illustrating the step of forming contact holes on the contact pad according to a third embodiment of the method of manufacturing an infrared sensor.

Next, the contact hole 81 is formed on the contact pad area without the formation of the second infrared protection layer as shown in FIG. 15. It is formed by etching the silicon oxynitride layer (third insulation layer) 71 by means of photolithography and reactive ion etching to expose the surface of the contact pad area in the same way as the first embodiment.

Figure 16:
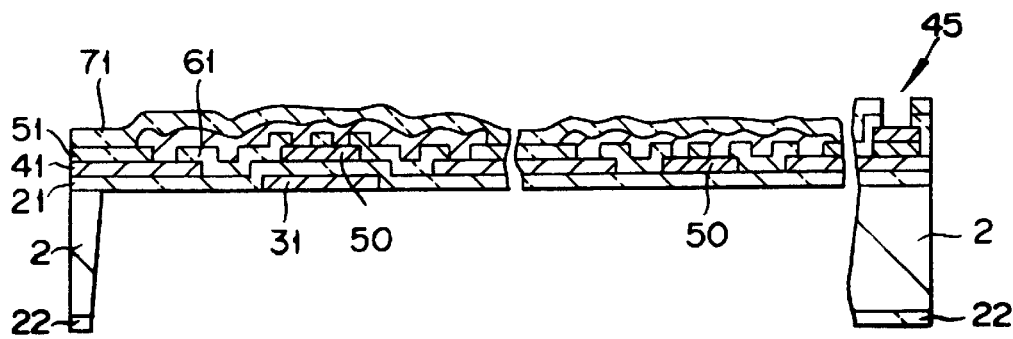
FIG. 16 is a schematic cross section illustrating the step of forming bridge structures.

Then, the bridge structure is formed as shown in FIG. 16. The process includes steps of forming a pattern of bridge structure by means of the combination of photolithography and reactive ion etching, forming a window frame-shaped pattern, which corresponds to the frame work of involving infrared sensor, by means of etching, and wet-etching the back surface (inside of the frame) of the silicon substrate 2, which corresponds to the back side of the elements in the same way as the first embodiment.

Figure 17:
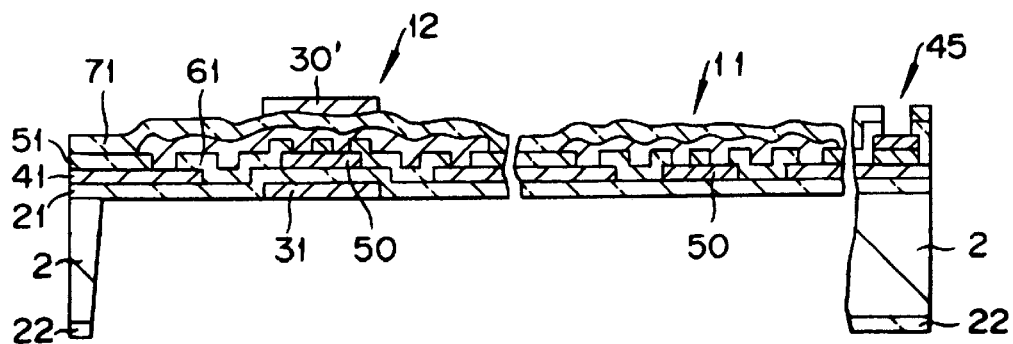
FIG. 17 is a schematic cross section illustrating the step of forming a second infrared protection layer on the compensating element surface.

Finally, the gold layer 30' as the second infrared protection layer is formed on the third insulation layer 71 on the front side of the compensating element 12 as shown in FIG. 17. Thus, the infrared sensor is produced, wherein the main body of the compensating element is covered by the second infrared protection layer of gold and the first infrared protection layer of aluminum.

As explained in the above, the present invention can prevent inclining incident or circumventing incident infrared rays caused by reflections, which were inevitable in the prior art as the prevention means were simple shelters, from reaching the compensating element. Because the infrared protection layers are formed via the insulation layers in the areas of the compensating element where the incident infrared rays must be prevented. As a result, the quantity of infrared rays can be more accurately detected. Moreover, if the infrared protection layers are capable of reflecting infrared rays, the infrared protection effect can be further enhanced. Furthermore, an infrared sensor having infrared protection layers on the front and back sides of the compensating element can be easily manufactured.

It is obvious that this invention is not limited to the particular embodiments shown and described above but may be variously changed and modified without departing from the technical concept of this invention. For example, the invention can be applied not only to circular disk type compensating elements but also to those of egg shapes or cylindrical shapes. Moreover, the entire compensating element can be covered with an infrared protection layer, if it is desired to shield the entire compensating element.

Incidentally, the entire disclosure of Japanese Patent Application No. 09-164220 filed on Jun. 20, 1997, including the specification, claims, drawings and summary are incorporated herein by reference in its entirety.

What is claimed is:

1. An infrared sensor comprising:
   an infrared sensitive element for detecting infrared rays;
   a compensating element for obtaining a signal to be used as a basis for calculating a quantity of infrared rays detected, the compensating element having two surfaces; and
   infrared protection layers formed on both surfaces of said compensating element for protecting it from infrared rays, each of the infrared protection layers having an exposed surface.

2. An infrared sensor according to claim 1, in which said infrared sensitive element and said compensating element are supported on a silicon substrate by means of bridge structures.

3. An infrared sensor according to claim 1, in which said infrared protection layers are individually made of a material that reflects infrared.

4. An infrared sensor according to claim 3, in which said materials constituting said infrared protection layers are individually metal.

5. An infrared sensor according to claim 4, in which said metals constituting said infrared protection layers are individually aluminum or gold.

6. An infrared sensor according to claim 1, in which said infrared protection layers are individually made of a material that is capable of shielding infrared rays.

7. An infrared sensor according to claim 1, further comprising an insulation layer held between one of the surfaces and one of said infrared protection layers, and an insulation layer held between the other of the surfaces and the other of said infrared protection layers.

8. A method of manufacturing an infrared sensor comprising the steps of:
   (a) forming a pattern of first infrared protection layer on a first surface of a silicon substrate;
   (b) forming first insulation layers on the first surface and a second surface opposite to the first surface;
   (c) forming a pattern of temperature-sensing layer on the first insulation layer on the first surface;
   (d) forming a wiring pattern on the first insulation layer and the temperature-sensing pattern;
   (e) forming a pattern of second insulation layer on the first surface;
   (f) forming a wiring pattern on the temperature-sensing layer;
   (g) forming a third insulation layer on the first surface;
   (h) forming a pattern of second infrared protection layer on the third insulation layer;
   (i) forming a pattern of bridge structures from the first through third insulation layers on the first surface;
   (j) forming a window frame-shaped pattern from the first insulating layer on the second surface; and
   (k) etching the second surface using the first insulating layer as a mask to form the bridge structures and to expose an inner surface of the first insulating layer on the first surface.

9. A method of manufacturing an infrared sensor according to claim 8, in which said first and second infrared protection layers are made of a material that reflects infrared rays.

10. A method of manufacturing an infrared sensor according to claim 9, in which said material is metal.

11. A method of manufacturing an infrared sensor according to claim 10, in which said metal is aluminum.

12. A method of manufacturing an infrared sensor according to claim 8, in which said first and second infrared protection layers are made of a material that is capable of shielding infrared rays.

13. A method of manufacturing an infrared sensor comprising the steps of:
   (a) forming first insulation layers on a first surface and a second surface opposite to the first surface of a silicon substrate;
   (b) forming a pattern of temperature-sensing layer on the first insulation layer on the first surface;
   (c) forming a wiring pattern on the first insulation layer and the temperature-sensing pattern;
   (d) forming a pattern of second insulation layer on the first surface;
   (e) forming a wiring pattern on the temperature-sensing layer;
   (f) forming a third insulation layer on the first surface;
   (g) forming a pattern of bridge structures from the first through third insulation layers on the first surface;
   (h) forming a window frame-shaped pattern from the first insulation layer on the second surface;
   (i) etching the second surface using the pattern of the first insulating layer as a mask to expose an inner surface of the first insulating layer on the first surface;

(j) forming a pattern of infrared protection layer on the inner surface of the first insulating layer; and (k) forming a pattern of infrared protection layer on the third insulation layer.

14. A method of manufacturing an infrared sensor according to claim 13, in which said infrared protection layer is made of a material that reflects infrared rays.

15. A method of manufacturing an infrared sensor according to claim 14, in which said material is metal.

16. A method of manufacturing an infrared sensor according to claim 15, in which said metal is gold.

17. A method of manufacturing an infrared sensor according to claim 13, in which said infrared protection layer is made of a material that is capable of shielding infrared rays.

18. A method of manufacturing an infrared sensor comprising the steps of:

(a) forming a pattern of first infrared protection layer on a first surface of a silicon substrate;

(b) forming first insulation layers on the first surface and a second surface opposite to the first surface of the silicon substrate;

(c) forming a pattern of temperature-sensing layer on the first insulation layer on the first surface;

(d) forming a wiring pattern on the first insulation layer and the temperature-sensing pattern;

(e) forming a pattern of second insulation layer on the first surface;

(f) forming a wiring pattern on the temperature-sensing layer;

(g) forming a third insulation layer on the first surface;

(h) forming a pattern of bridge structures from the first through third insulation layers on the first surface;

(i) forming a window frame-shaped pattern from the first insulation layer on the second surface;

(j) etching the second surface using the pattern of the first insulating layer as a mask to expose an inner surface of the first insulating layer on the first surface; and (k) forming a pattern of second infrared protection layer on the third insulation layer.

19. A method of manufacturing an infrared sensor according to claim 18, in which said first and second infrared protection layers are individually made of a material that reflects infrared rays.

20. A method of manufacturing an infrared sensor according to claim 19, in which said materials constituting said first and second infrared protection layers are individually metal.

21. A method of manufacturing an infrared sensor according to claim 20, in which said metal constituting the first infrared protection layer is aluminum and said metal constituting the second infrared protection layer is gold.

22. A method of manufacturing an infrared sensor according to claims 18, in which the first and second infrared protection layers are individually made of a material that is capable of shielding infrared rays.

* * * * *